(12) United States Patent
Dempsey

(10) Patent No.: US 6,526,021 B1
(45) Date of Patent: *Feb. 25, 2003

(54) CLEAR CHANNEL 1:N SONET TRANSPORT SYSTEM AND METHOD

(75) Inventor: Don G. Dempsey, Grapevine, TX (US)

(73) Assignee: Alcatel Network Systems, Inc., Richardson, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/054,557

(22) Filed: Apr. 3, 1998

(51) Int. Cl.[7] .............................. H04L 12/20; H04J 3/22
(52) U.S. Cl. .................... 370/227; 370/328; 370/538; 370/545; 370/907
(58) Field of Search .................... 370/221, 222, 370/223, 224, 225, 226, 227, 228, 535, 536, 537, 538, 539, 540, 541, 542, 543, 544, 907, 545; 341/361–67

(56) References Cited

U.S. PATENT DOCUMENTS

| 5,216,666 | A | * | 6/1993 | Stalick | 370/222 |
| 5,408,462 | A | * | 4/1995 | Opoczynski | 370/220 |
| 5,412,652 | A | * | 5/1995 | Lu | 370/223 |
| 5,696,761 | A | * | 12/1997 | Kos et al. | 370/386 |
| 5,724,349 | A | * | 3/1998 | Cloonan et al. | 370/390 |
| 5,760,936 | A | * | 6/1998 | Shirai | 359/128 |
| 5,841,760 | A | * | 11/1998 | Martin et al. | 370/242 |
| 5,905,723 | A | * | 5/1999 | Varghese et al. | 370/351 |
| 5,978,353 | A | * | 11/1999 | Iwahori et al. | 370/217 |
| 6,044,080 | A | * | 3/2000 | Antonov | 370/401 |
| 6,049,525 | A | * | 4/2000 | Takahashi et al. | 370/223 |
| 6,088,371 | A | * | 7/2000 | Inada et al. | 370/537 |
| 6,094,440 | A | * | 7/2000 | Sugawara et al. | 370/465 |
| 6,147,968 | A | * | 11/2000 | De Moer et al. | 370/225 |
| 6,205,158 | B1 | * | 3/2001 | Martin et al. | 370/541 |

\* cited by examiner

Primary Examiner—Hassan Kizou
Assistant Examiner—Saba Tsegaye
(74) Attorney, Agent, or Firm—Gray Cary Ware & Freidenrich, LLP

(57) ABSTRACT

A SONET format signal transport system and method providing an increased transport capacity. The transport system includes multiple low speed transport systems wherein each low speed transport system can have a pair of low speed terminals connected by N working channels and one protection channel. A clear channel high speed SONET transport system is connected between the low speed transport systems. The clear channel high speed SONET transport system has N+1 working channels that each terminate at a high speed terminal. The low speed system protection channels are multiplexed into a protection channel of the clear channel high speed system, while each working channel of each individual low speed system is multiplexed into different high speed channels.

12 Claims, 2 Drawing Sheets

CLEAR CHANNEL 1:N SONET TRANSPORT SYSTEM AND METHOD

TECHNICAL FIELD OF THE INVENTION

The present invention relates generally to telecommunication systems and methods, and more particularly, to a system and method for transporting synchronous optical network data more rapidly using an N terminal high speed transport system coupled between 1:N low speed transport systems.

BACKGROUND OF THE INVENTION

A synchronous optical network (SONET) is one type of telecommunications network that uses a SONET protocol to define the format of data transmitted across a SONET transport system. SONET systems operate at varying optical rates (i.e., the number of 51 MHz signal equivalents the system transmits on an optical fiber). For example, an OC48 channel transports forty-eight 51 MHz signals, or approximately 2.5 GHz, from transmitter to receiver on a single fiber.

Many telecommunication system users have installed 1:N SONET transport systems for point to point transfer of telecommunications data. A conventional 1:N SONET transport system, as shown in FIG. 1, has one protection channel and N working channels (for example, OC 48 channels) connected between two terminals operable to send and receive data over the N channels. The terminals will typically have the same number of input and output channels at each end of the system. If any of the N working channels in the 1:N SONET transport system fails (due to, for example, failure of either a transmitter or receiver), the terminal will transfer the data flowing over the failed channel to the protection channel. This protects any one failed working channel, but cannot protect data on more than one failed working channel at a time. Therefore, if two (or more) working channels fail at the same time, some data will be lost.

In order to accomplish the protection of data if a working channel fails, a negotiation must occur between the two terminals so that the transmitting terminal switches to the protection line and the receiving terminal receives the data on the protection line. A switching protocol for accomplishing this switching typically uses two bytes in a SONET transport system, the K1 and K2 bytes. Both terminals contain the switching protocol to accomplish the protection when a channel fails. The switching protocol is typically transmitted over the protection channel and is defined by an industry standard. As data traffic increases, a user of a 1:N SONET transport system has several options to increase the data transport capacity. First, a user can add working channels to the SONET system, however, there is a limit to the number of working channels that can run between two terminals in a SONET system. The theoretical limit is fourteen working channels as defined by the protocol, however, the practical limit is typically less than fourteen working channels due to current equipment and reliability constraints. The more working channels a SONET system incorporates, the more likely two or more working lines will fail at the same time, resulting in the loss of data (because only one protection line exists). Second, a user can add terminals and the fibers constituting channels between the terminals. However, this becomes prohibitively expensive due to the cost of purchasing and laying the optical fiber cabling between terminals (and the expense of additional terminals).

In order to avoid the cost of additional optical fibers, standard 1:M High Speed SONET transport systems have been conceived that connect more rapid 1:M terminals (having one protection channel and M working channels) between sets of the lower speed 1:N terminals, as shown in FIG. 2. The conventional 1:N SONET terminals will connect to a 1:M terminal having higher rate channels coupled to another 1:M terminal. The 1:N terminal sends the data to a 1:M terminal that packages the data, transmits it over the higher rate channel to the receiving 1:M terminal that forwards the data to the appropriate 1:N receiving terminal. Each of the 1:M terminals, similarly to the 1:N terminals, also has a single protection line to protect the information being transmitted between the 1:M terminals. In a 1:M high speed SONET system, the protection is controlled by the high rate system protocol.

Conventional 1:M high speed systems have two major problems: compatibility between the 1:M and 1:N protocols; and building protocols for both the 1:M and 1:N terminals. In a standard 1:M high speed SONET transport system, the 1:N terminals must use exactly the same protocol as the 1:M terminal in order to communicate. This requirement will often not be met when the 1:N terminals are manufactured by a different vendor than the 1:M terminals. To complicate matters further, the standard SONET protocol is such that even when two vendors comply with the standard SONET protocol, the variation allowed between two compliant protocols can result in communication failure between the two protocols.

Furthermore, the switching protocols (and other protocols) must be built and implemented into both the lower rate 1:N system and the higher rate 1:M SONET transport systems. This problem will be exacerbated if a vender of one of the terminals builds a switching protocol that does not conform with the SONET standards.

SUMMARY OF THE INVENTION

The present invention provides a system and method for transporting SONET data that substantially eliminates or reduces disadvantages and problems associated with previously developed SONET transport systems and methods.

More specifically, the present invention provides a system for increasing the transport capacity of a SONET transport system. The SONET transport system includes multiple low speed SONET transport systems wherein each low speed SONET transport system can have a pair of low speed terminals connected by N working channels and one protection channel. A clear channel high speed SONET transport system is connected between each low speed SONET transport system. The clear channel high speed SONET transport system has N+1 working channels that each terminate at a high speed terminal. The low speed system protection channels are multiplexed into one channel of the clear channel high speed system, while each working channel of each individual low speed system is multiplexed into different high speed channels.

The present invention provides an important technical advantage by increasing the speed of transport of data over a SONET system without an inordinate increase in the number of optical fibers required to accomplish the transport.

The present invention provides another technical advantage by providing a system that interfaces a high speed transport system between low speed transport system without requiring special protocols created to interface between the high speed and low speed system. By operating a high speed clear channel system between the low speed system, the high speed system is protocol independent.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGURES, like numerals being used to refer to like and corresponding parts of the various drawings.

Figure 1:
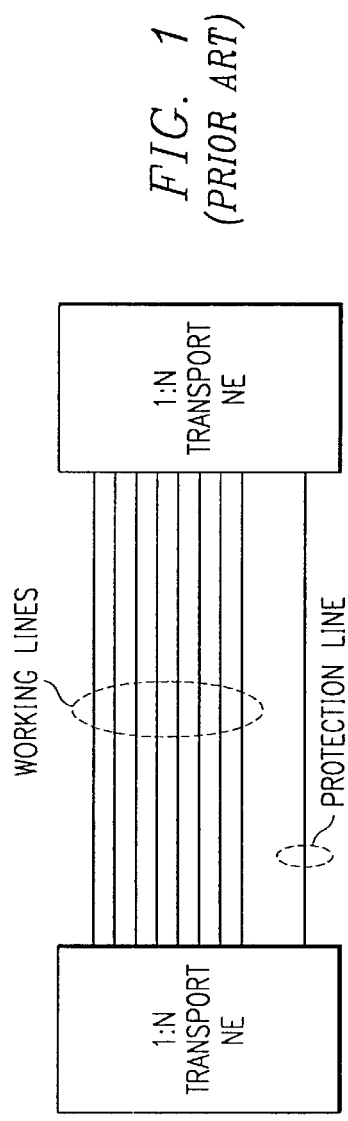
FIG. 1 shows a prior art SONET transport system having two low speed terminals connected by N working channels and one protection channel.
Figure 2:
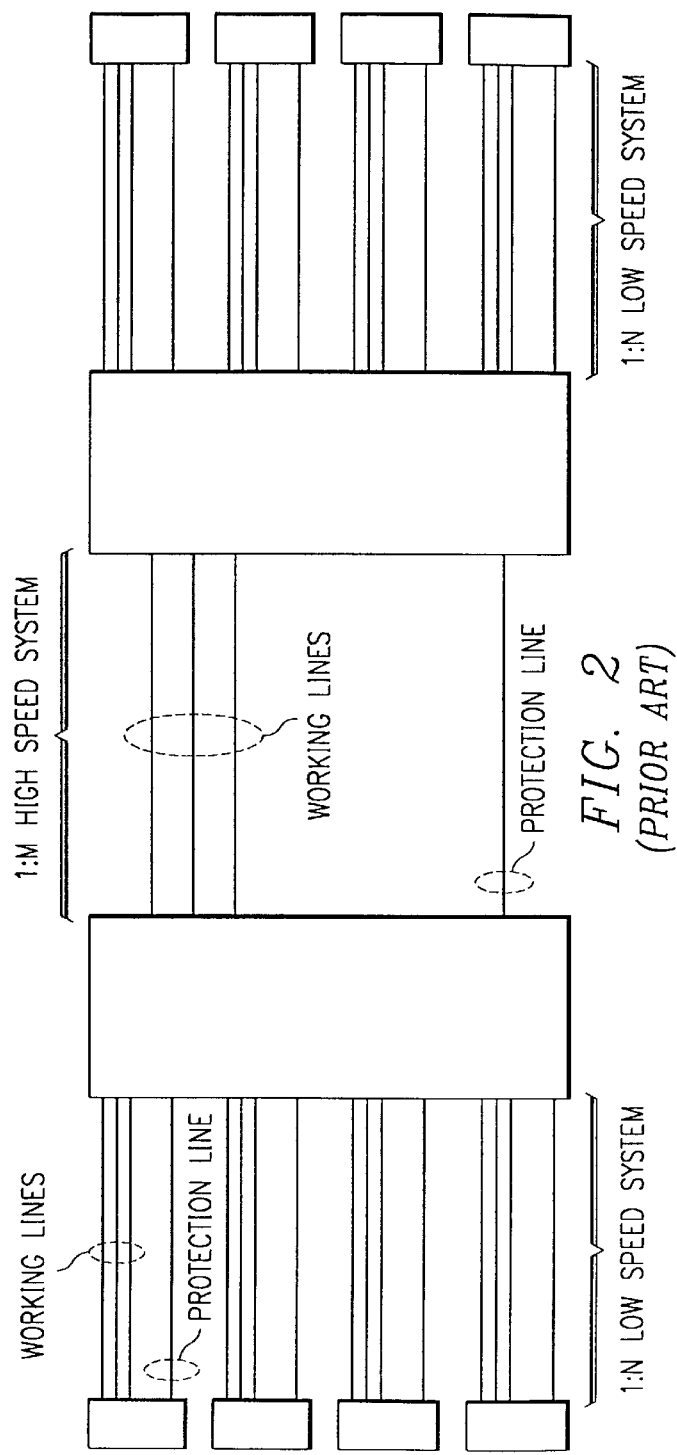
FIG. 2 shows a standard prior art 1:M High Speed SONET transport systems that connects a number of high speed terminals, having one protection channel and M working channels, between sets of the lower speed 1:N terminals.
Figure 3:
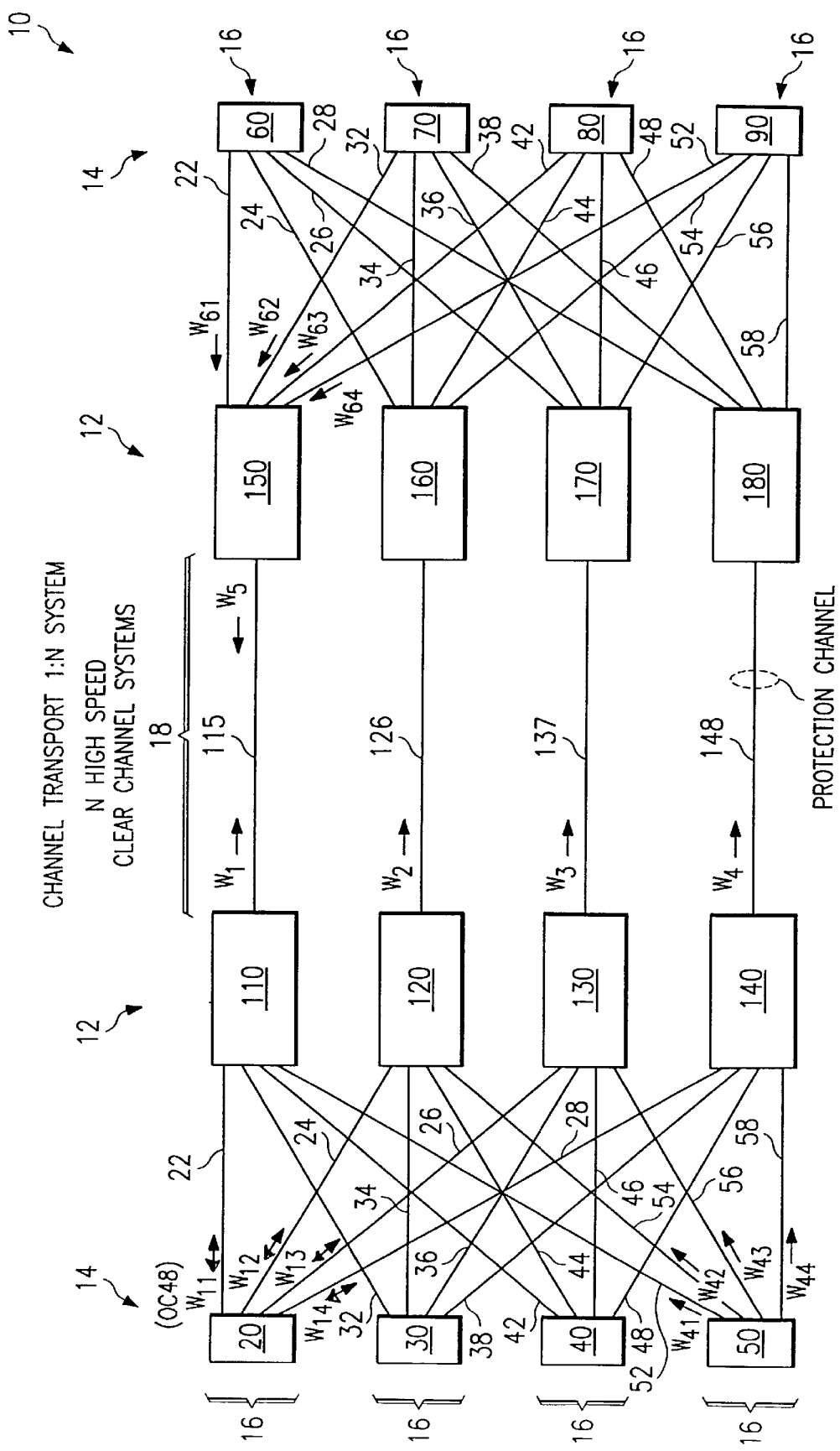
FIG. 3 is one embodiment of the clear channel 1:N SONET transport system of the present invention having a 0:1 high speed clear channel system connected between two sets of four 1:3 low speed systems.

The present invention provides a SONET clear channel transport system that increases the transport capacity per channel by multiplexing each lower rate working channel of a low rate transport system into separate higher rate channels of a clear channel high rate SONET transport system. The protection channel from each lower rate system is also multiplexed into a channel separate from the lower rate working channels to provide protection for each working channel. The clear channel transport provides the transport of the lower rate systems, signaling control and other overheads from one end of the low rate system to the other end, while the switching protection is provided by the lower rate systems. A SONET clear channel transport 1:N system of the present invention can have a plurality of low speed terminals having N or fewer working channels and a protection channel coupled to N+1 clear channel high speed terminals. FIG. 3 shows a SONET clear channel transport 1:N system of the present invention having a plurality of 1:N low speed systems 16 connected by an N+1 high speed clear channel system 18, where N=3. In the FIG. 3 embodiment, the four high speed terminal system 18 includes four 0:1 high speed clear channel terminals 12, each 0:1 high speed terminal 12 coupled to another 0:1 high speed terminal by a single working channel. The 0:1 designation refers to the fact that the high speed terminals operate without a protection line and with one working channel. The four 1:3 low speed systems 16 each include two low speed terminals 14 (one at each end of the overall system 10), where each low speed terminal 14 connects to each of the four 0:1 high speed terminals 12. The clear channel designation refers to the fact that transmission of signals received as an input to a clear channel terminal will be sent out as an output with all of the overhead/control bytes that the signal had when entering the terminal. It should be understood that the present invention can work with any configuration conforming to the requirement that the number of working channels in the high speed clear channel transport system must be equal to or greater than the maximum number of low speed working channels in any one low speed terminal system. For illustration purposes, the channels from the low speed terminals can transport SONET OC 48 signals and the channels from the high speed terminals can transport SONET OC 192 signals. It should be further understood that different low speed signal rates and high speed signal rates can be accommodated using the present invention.

With reference to FIG. 3, the first low speed SONET transport system 16 includes 1:3 low speed terminal 20 connected to 1:3 low speed terminal 60 via clear channel high speed SONET transport system 18. Low speed terminal 20 connects to low speed terminal 60 via three working channels 22, 24, 26, and one protection channel 28. Each of these channels connects to one of the four working channels of high speed SONET transport system 18 (and thus, to different 0:1 high speed terminals 12). Working channel 22 connects low speed terminal 20 to high speed terminal 110 and low speed terminal 60 to high speed terminal 150, working channel 24 connects low speed terminal 20 to high speed terminal 120 and low speed terminal 60 to high speed terminal 160, working channel 26 connects low speed terminal 20 to high speed terminal 130 and low speed terminal 60 to high speed terminal 170, and protection channel 28 connects low speed terminal 20 to high speed terminal 140 and low speed terminal 60 to high speed terminal 180. Low speed terminals 30, 40, 50, 70, 80, and 90 connect to high speed terminals 110, 120, 130, and 140, and 150, 160, 170 and 180 in a similar manner as shown in FIG. 3.

High speed terminal 110 connects to high speed terminal 150 via working channel 115, high speed terminal 120 connects to high speed terminal 160 via working channel 126, high speed terminal 130 connects to high speed terminal 170 via working channel 137, and high speed terminal 140 connects to high speed channel 180 via protection channel 148. In this manner, low speed terminals 14 from each low speed system 16 are connected via the clear channel high speed SONET transport system 18.

The configuration of the SONET clear channel transport 1:N system of the present invention is such that all of the protection lines from the multiple low speed terminals of all of the 1:N low speed systems 16 connect to the same high speed terminal of the N+1 high speed channel system 18 (terminals 140 and 180 in FIG. 3). Thus, the channel 148 connecting high speed terminals 140 and 180 becomes the protection channel for both the high speed system 18 and the 1:N low speed systems 16. The configuration of the present invention connects each channel of the low speed terminals to the corresponding low speed terminal at the other end of the low speed system 16 via a high speed channel connection consisting of a high speed terminal connected by a single high speed channel to second high speed terminal. For example, channel 22 from terminal 20 connects to channel 22 from terminal 60 is connected via channel 150 between high speed terminals 110 and 150.

In operation, the present invention increases the speed of signal transport. With reference to FIG. 3, terminal 20 can transmit OC48 SONET transport signal $W_{11}$ across working channel 22 to high speed terminal 110. Likewise, terminal 30 sends transport signal $W_{21}$ across channel 32, terminal 40 sends transport signal $W_{31}$, across channel 42, and terminal So sends transport signal $W_{41}$ across channel 52 to high speed terminal 110. High speed terminal 110 will receive each of the incoming transport signals $W_{11}$, $W_{21}$, $W_{31}$, and $W_{41}$ and will electrically package these signals as one OC192 signal $W_1$ and transport the entire signal W, to high speed terminal 150 across working channel 115. This electronic packaging can be done through electrical multiplexing or, alternatively, through optical multiplexing.

The clear channel tributaries of the 0:1 high speed terminals can mix the signals so that terminal 150 can demultiplex the W, signal to recreate exactly signals $W_{11}$, $W_{21}$, $W_{31}$, and $W_{41}$. This transportation is called a clear channel transport because each of the signals that comes into high terminal 110 goes out of high speed terminal 150 without alteration of the signal (i.e., the exact signal is transmitted out of high speed terminal 150 that entered high speed terminal 110 because the clear channel transport allows the control bytes for each signal to remain intact while passing through a high speed terminal). It should be understood that non-clear channel systems could also employ the architecture of the present invention provided such a system did not require exact duplication of the input signals at the output receivers. High speed terminal 150 will transmit signal $W_{11}$ to low speed terminal 60 across channel 22, signal $W_{21}$ to low speed terminal 70 across channel 32, signal $W_{31}$ to low speed terminal 80 across channel 42, and signal $W_{41}$ to low speed terminal 90 across channel 52.

High speed terminals 120 and 130 similarly accept signals from low speed terminals in the 1:N low speed systems 1G, multiplex the signals, send the multiplexed signals across a higher speed channel to high speed terminals 160 and 170 respectively. High speed terminals 160 and 170 will demultiplex the signals and send the demultiplexed signals to the corresponding low speed terminals.

Each channel in the system is bidirectional so that the process works identically in both directions. Therefore, high speed terminal 150 receives OC48 transport signals $W_{61}$, $W_{62}$, $W_{63}$, and $W_{64}$ from low speed terminals 60, 70, 80, and 90 respectively and will multiplex the signals into a single OC192 signal $W_5$ and transport signal W, across channel 115 to high speed terminal 110. High speed terminal 110 will demultiplex the $W_5$ signal and will send signals $W_{61}$, $W_{62}$, $W_{63}$, and $W_{64}$ to low speed terminals 20, 30, 40, and 50 respectively. High speed terminals 160 and 170 similarly accept the OC48 transport signals from the connected low speed terminals, multiplex the signals and transport the multiplexed signal to high speed terminals 120 and 130. High speed terminals 120 and 130 demultiplex the signal and send the signals to the appropriate low speed terminal (20, 30, 40, or 50).

As noted earlier, high speed terminal 140 receives the protection channel from each of low speed terminals 20, 30, 40 and 50 and high speed terminal 180 receives the protection channel from each of low speed terminals 60, 70, 80, and 90. Thus, if channel 22 fails, terminal 20 switches the traffic to send transport signal $W_{11}$ out protection channel 28 to high speed terminal 140. High speed terminal 140 will transport signal $W_{11}$ across protection channel 148 as OC192 signal $W_{11}$ to high speed terminal 180. High speed terminal 180 will transport the signal $W_{11}$ across protection channel 28 to terminal 60. The switching protocol required to divert the OC48 transport signal $W_{11}$, from channel 22 to protection channel 28 and back to low speed terminal 60 over protection channel 28 is simply the switching protocol for the 1:N low speed system 16 contained within the low speed terminals. Due to the clear channel transport of the present invention, negotiation to switch to a protection channel and transport the signal occurs between the two corresponding low speed terminals and is independent of any switching protocol for the high speed terminal.

In the event a high speed channel fails, the protection works similarly. If high speed channel 115 fails out of high speed terminal 110, low speed terminal 20 will see the failure to transmit signal $W_{11}$ across working channel 22, low speed terminal 30 will see a failure to transmit signal $W_{21}$, across channel 32, low speed terminal 40 will see a failure to transmit signal $W_{31}$ across channel 42, and low speed terminal 50 will see a failure to transmit signal $W_{41}$ across channel 52. Each low speed terminal will then negotiate with its counterpart (terminal 20 with terminal 60, terminal 30 with terminal 70, terminal 40 with terminal 80, and terminal 50 with terminal 90) to move the signal to the appropriate protection channel. Thus, terminal 20 will re-route signal $W_{11}$ from channel 22 to channel 28, terminal 30 will re-route signal $W_{21}$ from channel 32 to protection channel 38, terminal 40 will re-route signal $W_{31}$ from channel 42 to channel 48, and terminal 50 will re-route signal $W_{41}$ from channel 52 to channel 58. All of these signals will go to high speed terminal 140. High speed terminal 140 will receive the OC48 signals $W_{11}$, $W_{21}$, $W_{31}$, and $W_{41}$, will multiplex these signals and will transmit multiplexed signal W, across channel 148 to high speed terminal 180. High speed terminal 180 will demultiplex signal $W_4$ and send signals $W_{11}$, $W_{21}$, $W_{31}$, and $W_{41}$ to low speed terminals 60, 70, 80, and 90 respectively. Low speed terminals 60, 70, 80, and 90 have negotiated with low speed terminals 20, 30, 40, and 50 respectively to receive these signals across the protection channels.

The present invention provides increased transport capacity per fiber between two geographical points without requiring a switching protocol between the high speed terminal and the low speed terminals. Instead, the present invention accomplish the protection using the geometry of the system and the protocols of the low speed terminals. As well as reducing cost of additional optical fiber, the present invention eliminates the time and expense of writing the software code for a low speed terminal to high speed terminal switching protocol. The present invention simply requires a single protection switching protocol implemented in each of the low speed terminals of any one low speed SONET transport system. For example, the protection switching protocol for low speed terminal 20 must match the protocol of low speed terminal 60, the protocol for low speed terminal 30 must match the protocol of low speed terminal 70, and so forth (note however, that the switching protocol for terminals 20 and 60 need not match the protocol of terminals 30 and 70, and so forth). The high speed terminals merely require transport functionality without any need to match the low speed terminal switching protocol. The high speed functionality of the present invention is therefore independent of switching protocols. The present invention is a simple method for providing high speed transport between 1:N low speed terminals.

As illustrated by FIG. 3, no two channels from a single low speed terminal may connect to a single high speed terminal to provide complete protection. In order to provide protection to all working channels, each low speed terminal channel must connect to a different high speed terminal.

Furthermore, the high speed protection and transport scheme of the present invention can be applied to alternative SONET transport systems. For example, the protection and high speed transport method of the present invention could be applied to a low speed unidirectional path-switched ring or a low speed four fiber bidirectional line switched ring. An N 0:1 terminal high speed clear channel system 18 as described herein can be placed between any two low speed terminals in a unidirectional path-switched ring or four fiber bidirectional line switched ring to incorporate the advantages of the present invention.

In summary, the present invention provides a SONET transport system that provides an increased transport capacity. The SONET transport system includes multiple low speed transport systems where each low speed transport system can have a pair of low speed terminals connected by N working channels and one protection channel. A clear channel high speed SONET transport system is connected between each low speed transport systems. The clear channel high speed SONET transport system can have N+1 working channels where each channel connects two high speed terminals. The low speed system protection channels are multiplexed into one protection channel of the clear channel high speed system, while each working channel of each individual low speed system is multiplexed into a different high speed channel. The SONET transport system of the present invention provides a simpler, protocol independent system and method for increasing the transport rate across a reduced number of optical fibers.

Although the present invention has been described in detail, it should be understood that various changes, substitutions and alterations can be made hereto without departing from the spirit and scope of the invention as described by the appended claims.

What is claimed is:

1. A SONET format signal transport system, comprising:
   a plurality of low speed transport systems, each low speed transport system comprising a pair of low speed terminals connected by a maximum of N working channels and one protection channel;
   a clear channel high speed SONET transport system connected between each low speed SONET transport system, the clear channel high speed SONET transport system comprising N+1 working channels, wherein each working channel terminates at a high speed terminal; and
   wherein each working channel of each low speed system multiplexes into a different one of the N+1 working channels of the clear channel high speed SONET transport system, and further wherein the protection channel of each low speed system is multiplexed into a protection channel of the clear channel high speed SONET transport system.

2. The system of claim 1, wherein the protection channel of the clear channel high speed SONET transport system is one of the N+1 working channels of the clear channel high speed SONET transport system distinct from the N+1 working channels of the clear channel high speed SONET transport system into which the low speed working channels multiplex.

3. The system of claim 1, wherein the plurality of low speed transport systems comprise a plurality of low speed SONET transport systems, and further wherein the plurality of low speed SONET transport systems comprise OC48 channels, and wherein the clear channel high speed SONET transport system comprises OC192 channels.

4. The system of claim 1, wherein the clear channel high speed SONET transport system terminals are operable to receive signals from low speed terminals, multiplex the received signals, transport the multiplexed signals across the N+1 working channels of the clear channel high speed SONET transport system, demuluplex the multiplexed signals, and send the signals to low speed terminals in the same format as received.

5. The system of claim 1, wherein the clear channel high speed SONET transport system terminals are operable to optically multiplex and optically demultiplex the signals received from low speed terminals in order to transport the signals.

6. The system of claim 1, wherein N equals 3.

7. The system of claim 1, wherein the number of low speed systems exceeds the number of high speed channels in the clear channel high speed SONET transport system.

8. The system of claim 1, wherein the low speed terminals of the low speed systems contain a switching protocol that controls switching from a failed working channel to the protection channel to protect data.

9. The system of claim 1, wherein the clear channel high speed SONET transport system comprises clear channel transport hardware that provides the transport of the low rate systems, signaling control and overheads from low rate terminal to low rate terminal across the high rate channel.

10. A SONET formatted signal transport system, comprising:
    a clear channel high speed SONET transport system, comprising:
    N+1 working channels; and
    2(N+1) clear channel high speed terminals, each clear channel high speed terminal connects to another clear channel high speed terminal by a single working channel;
    a first low speed SONET transport system connected to the clear channel high speed SONET transport system, comprising:
      a plurality of low speed terminals, each low speed terminal comprising:
        no greater than N working channels, wherein each working channel of a low speed terminal connects to a different one of a plurality of clear channel high speed terminals; and
        a protection channel, wherein the protection channel from each low speed terminal connects to a single clear channel protection high speed terminal, the protection high speed terminal receiving only protection channels from low speed terminals; and
    a second low speed SONET transport system connected to the clear channel high speed SONET transport system opposite the first low speed SONET transport system, comprising:
      a plurality of low speed terminals, each low speed terminal comprising:
        a maximum of N working channels, wherein each working channel of a low speed terminal connects to a different clear channel high speed terminal; and
        a protection channel, wherein the protection channel from each low speed terminal connects to a single clear channel protection high speed terminal, the protection high speed terminal receiving only protection channels from low speed terminals, the protection high speed terminal further connects to the protection high speed terminal that receives the protection channels from the first low speed transport system.

11. A method for increasing the transport capacity in a SONET format signal transport system, comprising:
    providing a high speed SONET transport system having N+1 working channels;
    providing a low speed transport system having a maximum of N working channels, and one protection channel;
    multiplexing each working channel of said low speed transport system into a different one out of said N+1 working channels of said high speed SONET transport system; and
    multiplexing said protection channel of said low speed transport system into a separate protection channel of said high speed SONET transport system.

12. The method of claim 11, wherein each low speed transport system comprises a low speed SONET transport system, and further wherein each low speed SONET transport system comprises a pair of low speed terminals connected by a maximum of N working channels and one protection channel, and wherein the clear channel high speed SONET transport system comprises N+1 working channels each terminating at a high speed terminal.

* * * * *